Figure 1:
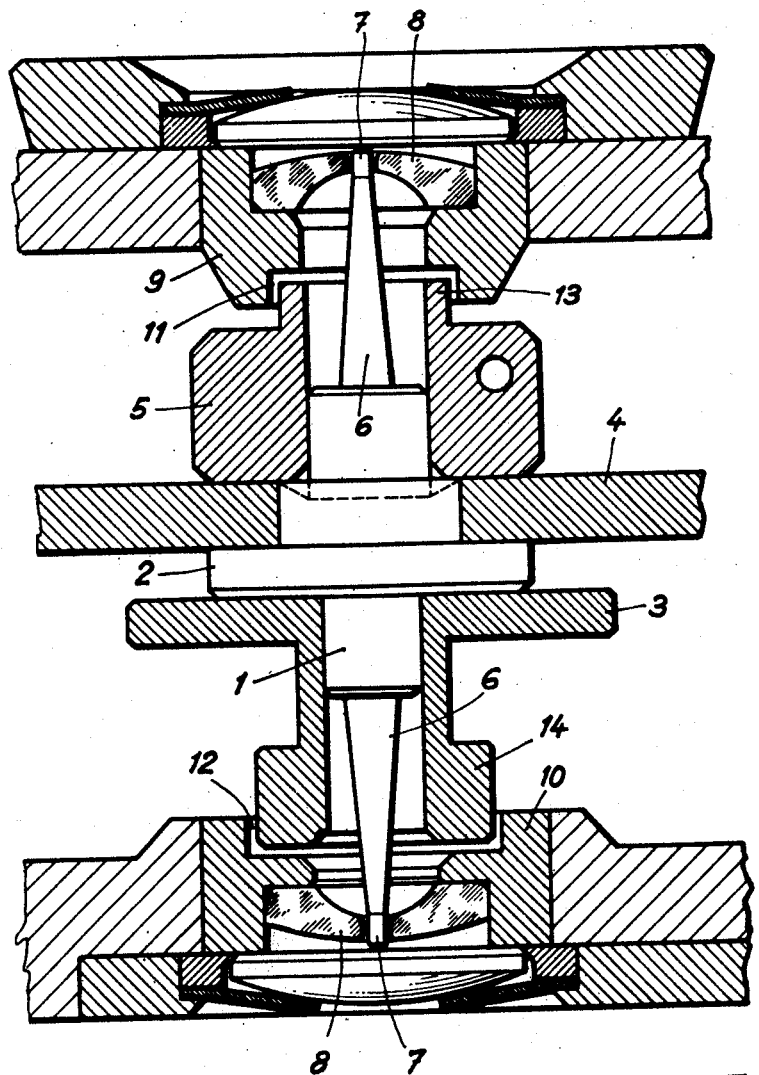

July 28, 1953  E. MORF  2,646,662
FLEXIBLE BALANCE STAFF

Filed March 18, 1949  2 Sheets-Sheet 1

Inventor
E. Morf

July 28, 1953 — E. MORF — 2,646,662
FLEXIBLE BALANCE STAFF
Filed March 18, 1949 — 2 Sheets-Sheet 2

Inventor
E. Morf

Patented July 28, 1953

2,646,662

UNITED STATES PATENT OFFICE 2,646,662

FLEXIBLE BALANCE STAFF

Ernest Morf, La Chaux-de-Fonds, Switzerland

Application March 18, 1949, Serial No. 82,140
In Switzerland December 2, 1948

3 Claims. (Cl. 58—140)

This invention relates to balance staff mountings for timepieces.

As is well known to those skilled in the art, the pivots of the balance staffs of timepieces are exposed to damage when absorbing radially directed shocks hitting the balance.

It is an object of my invention to protect the balance staff against such damage.

In the drawings affixed to this specification and forming part thereof two embodiments of my invention are illustrated diagrammatically by way of example. In the drawings Fig. 1 is an axial section through the balance assemblage and associated supporting structure of the first embodiment of the invention.

Figure 2:
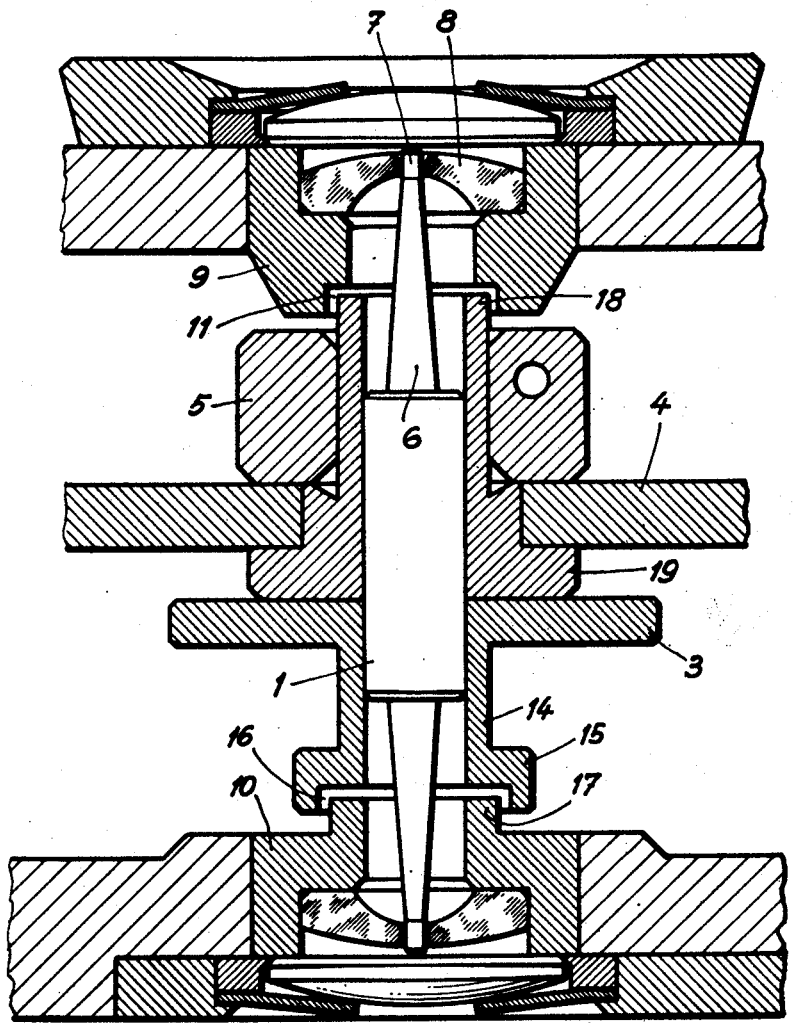

Fig. 2 is an analogous view of the second embodiment.

Referring now to Fig. 1, the balance staff is shown as being formed with three sections, namely a rigid, substantially cylindrical middle section 1 and two conical outer sections 6, the extreme ends 7 of which form cylindrical pivots. The axial length of the two conical sections combined may be about one half of the total length of the staff and their apex angles are small enough to render them sufficiently flexible to bend under the impact of radially directed shocks. It has a flange 2 separating the roller 3 and the balance 4 from each other. The balance spring collet 5 is force-fitted on the staff 1. The pivots 7 are journalled in pierced jewels 8. The settings 9 and 10 receiving the pierced jewels 8 have extensions directed towards the balance 4, which are provided with recesses 11 and 12 respectively. An extension 13 of the balance spring collet 5 enters the recess 11 and an extension 14 of the roller 3 projects into the recess 12. The diameters of the shanks 6, of the recesses 11 and 12 and of the extensions 13 and 14 are chosen so as to provide sufficient play for a good working of the balance, but only so much that the shanks 6, on the balance being hit by a shock directed perpendicularly to its axis, are bent only within the elasticity limit when the extensions 13 and 14 contact the rims of the recesses 11 and 12 respectively. In this way, the shock will be absorbed without damaging the pivots 7. The angle at the vertex of the conical envelopes (the angle between two opposite generatrices) of the shanks preferably is of the order of 7 to 8°. The diameter of the bores of the bearings through which the shanks pass is at least twice the diameter of the shanks 6. In this manner, the balance assemblage will be as shock-proof as if movable bearing members were used, without any special construction of the pierced jewel bearings. My new device will even work better in that there is no dependence on lubrication conditions of the bearing and on recentering conditions of the pivots. The pivots 7 do not change their place during a shock. My device is not higher in price than ordinary ones without shock absorbers.

It is understood that the shanks may even be longer than in the embodiments referred to above. There is no obstacle whatever for having them extend within reach of the balance. However, tests have proved that the above-mentioned length guarantees good results without unduly diminishing the volume of the staff and without rendering handling more difficult.

Referring now to Fig. 2, the second embodiment illustrated therein differs from the former only in the means for limiting the radial play. All parts are designated by the same reference characters as in Fig. 1. The flange 2 of the balance is replaced by a disc 19 integral with a tube 18 on which the balance spring collet 5 is fixed and which enters the recess 11 of the setting 9 in order to receive the shocks after the shanks 6 have been bent. At the other end of the staff 1, the roller 14 ends in a flange 15 provided with a recess 16 cooperating with the rim 17 of the setting 10 for the same reasons as given with regard to the first embodiment. The working of this embodiment is similar to that of the former and the dimensions of the shanks 6 as regards the length of the staff are equal to those of Fig. 1.

I wish it to be understood that I do not desire to be limited to the details shown in the drawings and described in the specification for obvious modifications will occur to a person skilled in the art.

What I claim is:

1. Balance staff mounting for timepieces comprising in combination, a staff consisting of three sections approximately equal in length, namely a rigid middle section and two conical outer sections whose apex angle is small enough to render them sufficiently flexible to bend under the impact of radially directed shocks, short rigid pivots at the extreme ends of said outer sections, perforated radial bearings surrounding said pivots, yieldably supported abutments above and below said pivots, a balance wheel seated on the middle part and flanged cylindrical bodies seated on the outer parts of said middle staff section, and means coaxial with said bodies arranged for limiting radial strokes of said staff.

2. The staff mounting of claim 1, in which the apex angle of the conical outer staff sections is of the order of 7–8°.

3. The staff mounting of claim 1, in which the flanged cylindrical bodies extend in axial direction alongside of part of the conical end sections of the staff.

ERNEST MORF.

References Cited in the file of this patent

UNITED STATES PATENTS

| Number | Name | Date |
|---|---|---|
| 827,137 | Addington | July 31, 1906 |
| 1,075,387 | Sokolowski | Oct. 14, 1913 |
| 1,310,038 | Stewart | July 15, 1919 |
| 1,707,542 | Sigler | Apr. 2, 1929 |

FOREIGN PATENTS

| Number | Country | Date |
|---|---|---|
| 89,078 | Switzerland | Apr. 16, 1921 |